J. R. LONG.
SHELLAC JAR.
APPLICATION FILED APR. 25, 1918.
1,318,161.
Patented Oct. 7, 1919.
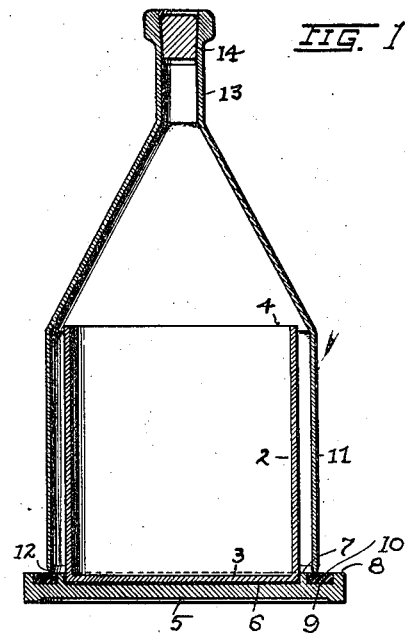
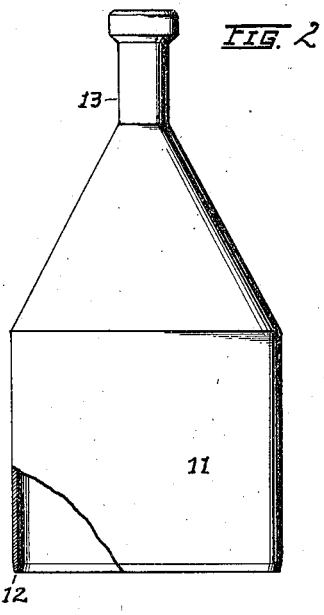
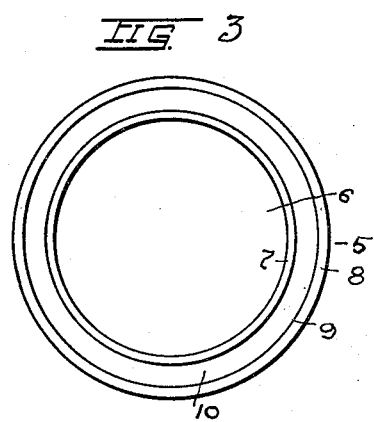
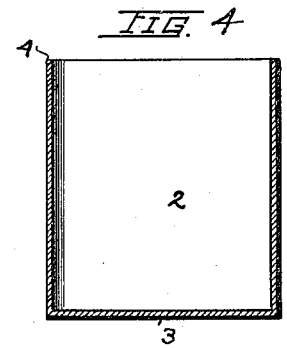
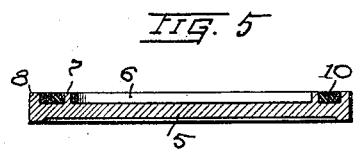
Inventor
J. R. LONG.
Witness
By Fisher & Moser
Attorneys

UNITED STATES PATENT OFFICE.

JOHN R. LONG, OF EAST AKRON, OHIO, ASSIGNOR TO C. A. THORNTON, OF CUYAHOGA FALLS, OHIO.

SHELLAC-JAR.

1,318,161.   Specification of Letters Patent.   Patented Oct. 7, 1919.

Application filed April 25, 1918. Serial No. 230,806.

*To all whom it may concern:*

Be it known that JOHN R. LONG, citizen of the United States, residing at East Akron, in the county of Summit and State of Ohio, has invented certain new and useful Improvements in Shellac-Jars, of which the following is a specification.

This invention pertains to an improvement in shellac jars, the object of the invention being to provide a suitable receptacle for holding shellac, varnish or other fluids having a volatile content and of a gummy nature, and further in providing a separate sealing base and cover adapted to be used with the receptacle and easily separable therefrom and from each other.

In the accompanying drawings, Figure 1 is a sectional view, through the assembled parts, of the complete shellac jar. Fig. 2 is a side view of the cover. Fig. 3 is a top plan of the flat base. Fig. 4 is a section of the receptacle, and Fig. 5 is a cross section of the base alone.

The invention comprises a cylindrical jar or receptacle 2 having a flat bottom 3 and an open top encircled by a wiping edge 4. The shellac or other fluid is placed in this jar, and the jar seated on a flat disk 5 within a shallow recess 6 which is formed by a relatively narrow annular rib 7 extending upwardly from the disk and concentric with a raised rim 8. Rib 7 prevents displacement of the jar from its seat as the diameter of the jar and ring correspond closely in size to provide a snug fit. Rib 7 and rim 8 are spaced apart to provide a shallow recess 9 within which a relatively wide flat rubber ring 10 is seated with its top face flush with the top edge of the rib and rim, and this rubber ring forms an air-sealing seat for the cover 11 which is of a much larger diameter and of greater length than the jar to completely inclose the same and to permit lateral movement in respect thereto but not beyond the outer edge of the rubber ring. The seating edge 12 of the cover is tapered and thinned to effect good sealing results, while the upper portion of the cover is conical and terminates in a tubular neck 13 which may be closed by a cork 14. The conical chamber in the cover accommodates the handle of the brush when left in the jar, and the straight neck and conical formation gives a convenient hand hold in lifting and replacing the cover.

The device is very simple; easy to handle and keeps clean; not readily tipped over, and excludes the air effectively from the jar. Used as a shellac jar in a pattern-shop, a large saving can be effected in the amount of shellac used daily, but its use is not necessarily limited to a pattern-shop.

What I claim is:

1. A shellac jar, comprising a cylindrical receptacle, a separate seating disk having a raised annular integral centering rib for said receptacle inwardly from the outer edge of the disk and provided with a flat rubber ring sustained encircling engagement with said rib, and a cylindrical cover of greater length and diameter than said receptacle having an annular bottom edge to seat upon said ring.

2. A shellac jar, comprising a disk having a central shallow round recess and a shallow annular channel concentric therewith, and with an endless raised rib therebetween, a flat rubber ring in said channel protected at its inner edge by said rib, a round receptacle removably seated in said central recess, and a cylindrical cover for the receptacle having an annular inclosing wall with a tapered bottom edge in seating engagement with said rubber ring.

Signed at Akron, in the county of Summit and State of Ohio, this 3rd day of April, 1918.

JOHN R. LONG.

Copies of this patent may be obtained for five cents each, by addressing the "Commissioner of Patents, Washington, D. C."